United States Patent [19]
Deal, Jr.

[11] Patent Number: 5,167,469
[45] Date of Patent: Dec. 1, 1992

[54] SLURRY DISTRIBUTION SYSTEM USING REMOTE DISTRIBUTORS

[76] Inventor: Troy M. Deal, Jr., 277 Trismen Ter., Winter Park, Fla. 32789

[21] Appl. No.: 642,653

[22] Filed: Jan. 17, 1991

[51] Int. Cl.$^5$ .............................................. E02B 1/00
[52] U.S. Cl. .................... 405/303; 239/745; 405/128; 405/258
[58] Field of Search ............... 405/258, 117, 116, 154, 405/128, 129; 239/736, 735, 743, 744, 745, 738, 747, 726, 195, 197

[56] References Cited

U.S. PATENT DOCUMENTS

| | | | |
|---|---|---|---|
| 2,097,452 | 11/1937 | Dearborn | 239/747 X |
| 2,722,454 | 11/1955 | Jepson | 239/745 |
| 3,246,848 | 4/1966 | Bowers | 239/736 X |
| 3,377,027 | 4/1968 | Mattson et al. | 239/745 |
| 3,445,066 | 5/1969 | Mohar | 239/745 |
| 4,756,260 | 7/1988 | Peterson | 111/123 |

*Primary Examiner*—Dennis L. Taylor
*Attorney, Agent, or Firm*—Beaman & Beaman

[57] ABSTRACT

A system for distributing a slurry of water and solids over a substantially large area wherein the solids may be distributed in a thin environmentally acceptable manner of uniform thickness or a land area or the bottom of a water area may be significantly raised in elevation. A plurality of aerial projectors in the form of nozzles mounted on vehicles distribute the slurry and the vehicle or vehicles move over the area in a predetermined manner and velocity to produce slurry distribution as desired.

2 Claims, 2 Drawing Sheets

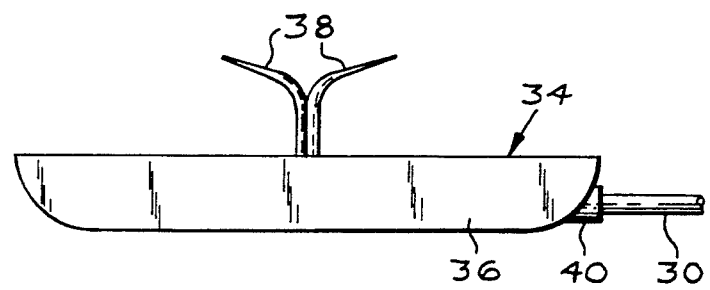
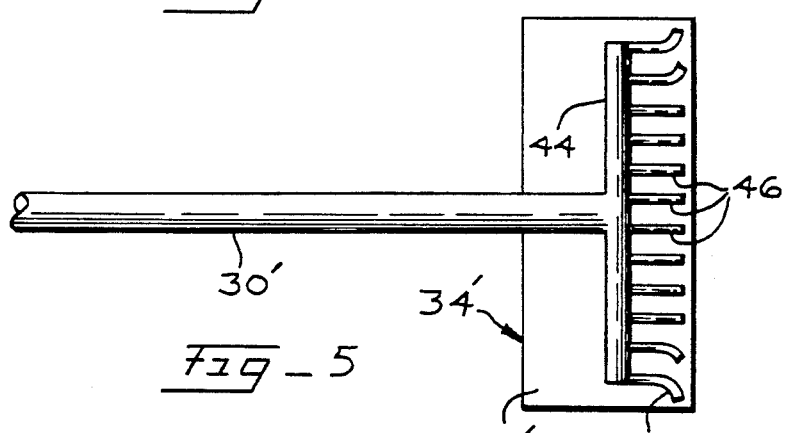
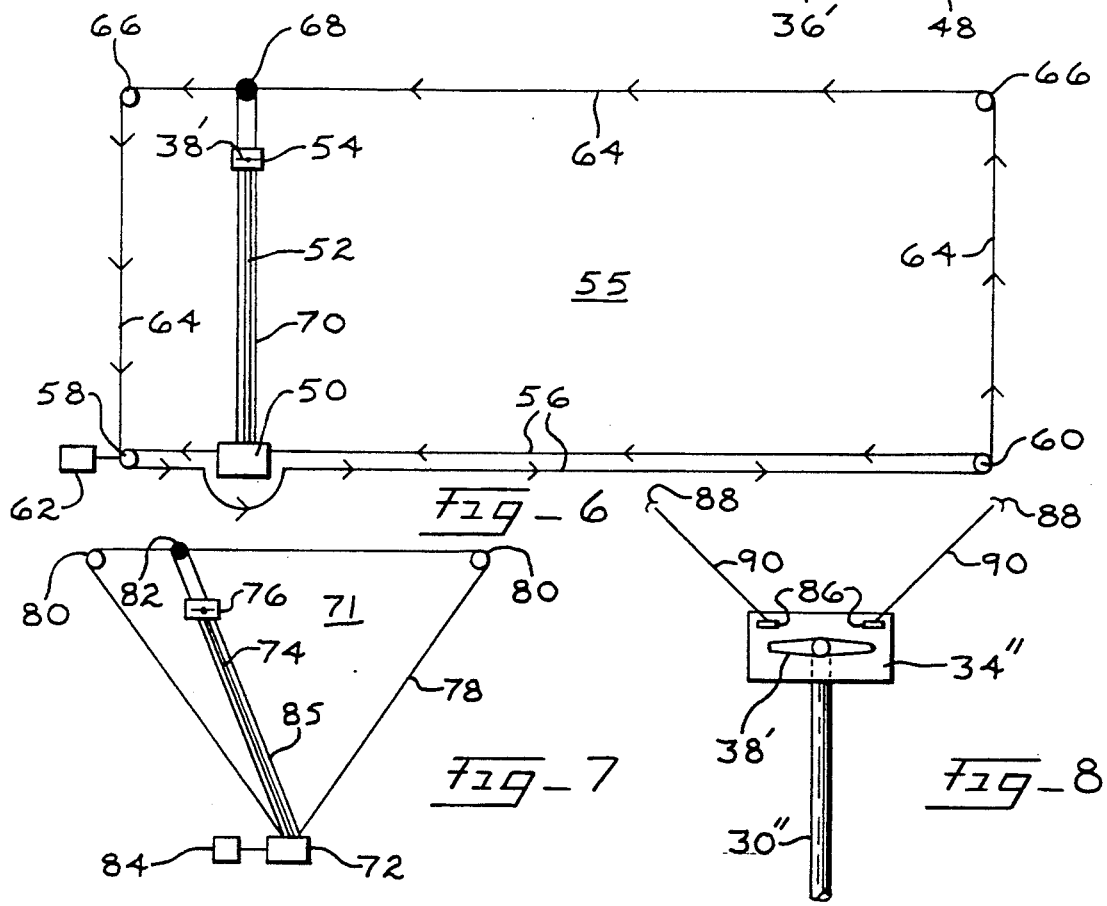

SLURRY DISTRIBUTION SYSTEM USING REMOTE DISTRIBUTORS

BACKGROUND OF THE INVENTION

In my U.S. Pat. No. 4,759,664 entitled Method of Building Or Restoring Marches And Beaches and U.S. Pat. No. 4,896,445 entitled Method For Reducing Costs And Environmental Impact Of Dredging I have disclosed methods and apparatus for dredging solids from a waterway, mixing the solids or spoils with water and projecting the slurry through high pressure nozzles wherein aerial projection of the slurry permits distribution of the solids or spoils over an area relatively closely associated with the dredge. As described in these patents aerial or jet spraying of the slurry permits the buildup of the solids to be accurately controlled, and if desired, the solids may be disbursed in a thin environmentally acceptable manner as described in U.S. Pat. No. 4,896,445 permitting the dredged material to be distributed adjacent the waterway without the buildup of thick piles or berms.

In U.S. Pat. No. 4,759,664 a method is disclosed for building up beaches or marshes to a higher elevation by the aerial distribution of a dredged slurry of water and spoils, and apparatus is disclosed wherein the high pressure nozzles or projectors for the slurry may be remotely supported from the dredge. However, while such disclosed apparatus permits the remote distribution of spoils through aerial projection the area of the land or water upon which the slurry is deposited must, necessarily, be located relatively close to the waterway being dredged, and as the patent only envisions the utilization of single aerial projectors the area receiving the slurry is limited.

It is an object of the invention to provide a method and apparatus for distributing a pumped slurry of water and solid spoils over a relatively large area whereby the distribution of the slurry over the area may be accurately regulated and controlled, and if desired, the depositing of the solids may be of such character as to create little negative environmental impact.

Another object of the invention is to provide a method and apparatus for distributing a slurry of water and solids over a relatively large area wherein a plurality of remote high pressure projectors are employed and the slurry distribution is automatically controlled and does not require manual supervision.

A further object of the invention is to provide a method and apparatus for distributing a slurry of water and solids over a relatively large area wherein an aerial projector for the slurry is mounted upon a vehicle and is translated thereover by force generated by the reaction pressure of the slurry projection.

An additional object of the invention is to provide method and apparatus for distributing a slurry of water and solids over a relatively large area wherein the slurry is distributed through an aerial projector mounted upon a vehicle which is translated over the area by a cable system which may be hydraulically powered utilizing the pressure of the pumped slurry.

In the practice of the invention a dredge removing solid spoils from a waterway produces a slurry of water and solid spoils which is pressurized by powerful pumps having an outlet which supplies a distributor or booster pump usually located on an adjacent land or water area. The pressurized slurry is supplied to a distributor or distribution system which may consist of a manifold or other conduit supplying flexible piping or conduit such as a hose. The hose supplies an aerial projector, such as a nozzle directed at an angle obliquely disposed to the horizontal, such as 45° or the like, and the aerial projector is capable of rotation and adjustability both vertically and about a vertical axis wherein the direction of the stream of slurry discharged may be accurately controlled. Also, defusers may be mounted upon the projector to defuse the stream of slurry being discharged therefrom. The aerial projector is mounted upon a vehicle, such as a sled, barge, or the like whose particular characteristics are largely determined by the nature of the area or terrain supporting the vehicle. The invention contemplates means for moving the projector vehicle across the area upon which the slurry is to be distributed, and as the vehicle moves through its predetermined path the projector will be permitted to rotate, or be aimed, as desired to distribute the slurry in the desired manner.

In one embodiment of the invention the pressurized slurry is fed into an elongated manifold having distribution stations axially spaced there along. The distribution stations include water powered reels upon which flexible conduit or hose may be wound. The other end of the hose is attached to an aerial projector in the form of a nozzle capable of rotating about a vertical axis. Initially, the vehicles upon which the aerial projectors are mounted are manually pulled away from the manifold conduit unreeling the hose from the associated reel and locating the plurality of aerial projectors adjacent the periphery of the land area upon which the slurry is to be deposited. As the pressurized slurry flows through the manifold, the distribution apparatus, the conduits, and is ejected from the aerial distributors the water powered reels slowly wind the hose upon the reels drawing the projector vehicles toward the reels. In this manner a plurality of projectors and vehicles are slowly drawn toward the elongated manifold as the hoses are retracted, and upon the hoses being substantially fully retracted the flow of pressurized slurry is terminated and a substantially equal amount of slurry and entrained solid spoils will have been deposited over the area covered by the slurry being discharged from the plurality of projectors.

In other embodiments of the invention the projector vehicles are attached to cable systems which may be hydraulically operated to move the vehicles and supported projectors through predetermined paths of movement such that each projector will cover a designated area.

In the practice of the invention it is also possible to use projector arrays which are non-rotatable, but distribute the slurry in a predetermined manner as the associated vehicle travels through a predetermined pattern. Also, it is within the scope of the invention to utilize the reaction forces of the slurry being ejected from a projector to constitute the motive force for translating the projector vehicle over a land or water area to be treated.

BRIEF DESCRIPTION OF THE DRAWINGS

The aforementioned objects and advantages of the invention will be appreciated from the following description and accompanying drawings wherein:

FIG. 4 is an elevational side view of an aerial projector sled, FIG. 5 is a plan view of an aerial projector and vehicle wherein the projector is of the non-rotating type, FIG. 6 is a plan schematic view of a cable operated version of the invention, FIG. 7 is a schematic plan view showing another embodiment of a cable operated version of the invention, and FIG. 8 is a schematic plan view of a further embodiment of a cable operated apparatus capable of utilizing the concepts of the invention over a water area.

DESCRIPTION OF THE PREFERRED EMBODIMENTS

Figure 1:
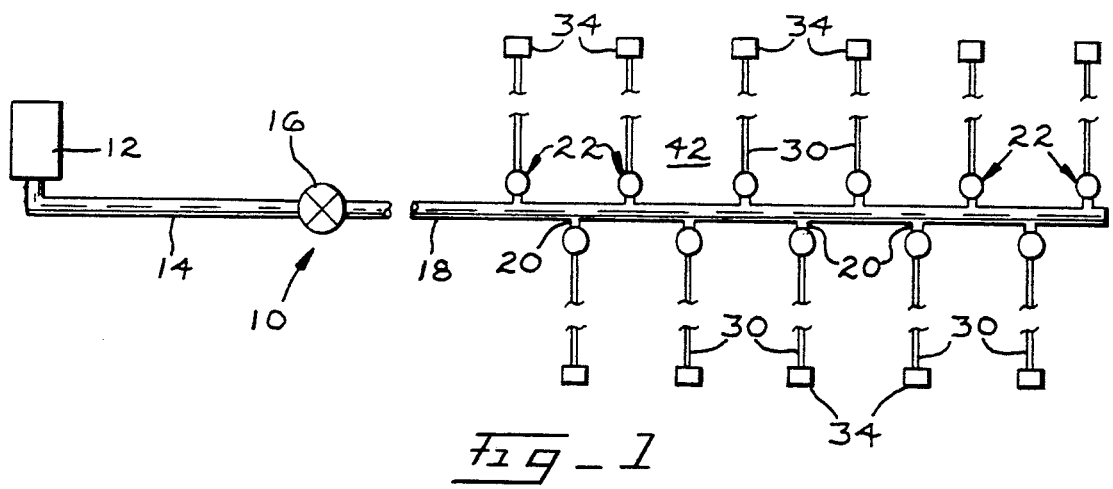
FIG. 1 is a schematic plan view of one embodiment of the invention utilizing an elongated manifold and a plurality of conduit systems employing hose reels.

A schematic illustration of a slurry distribution system using remote distributors utilizing the concepts of the invention is shown in FIG. 1 and the system is generally indicated by reference 10. A dredge 12 of conventional construction floats in a waterway adjacent to the land area over which the slurry is to be distributed, and a large flexible pipeline 14 interconnects the dredge 12 with a booster pump 16. The pipeline 14 may be of large diameter, such as 30 inches, and the booster pump 16 is likewise of a large capacity having an outlet supplying the elongated manifold conduit 18 which extends to the right of the booster pump as illustrated in FIG. 1.

A plurality of lateral feeder conduits 20 communicate with the manifold conduit 18 and are equally axially spaced therealong, and each of the feeder conduits 20 constitutes the supply for a retractor unit 22.

The retractor units 22 are of identical construction and each consists of a reel generally designated at 24. The reel construction employs side flanges 26, and support discs 28 are mounted adjacent the outside of the flanges 26. The reel 24 rotates about a vertical axis, and is rotated by a water powered drive motor 29 in communication with the feeder conduit 22. As pressurized slurry enters the motor 29 the motor slowly rotates the reel 24 so as to wind the flexible hose conduit 30 on the reel between the side flanges 26. Preferably, a level wind unit 32 of conventional construction extends between the support discs 28 and uses threads and a hose guide to uniformly distribute the hose over the reel 24 as the hose is wound thereupon.

At the outer end of each flexible hose 30 a vehicle generally indicated at 34 is mounted. With reference to FIG. 4, the vehicle may take the form of a floatable sled hull 36. However, it is to be appreciated that the vehicle 34 may have wheels, rollers, or other supports for facilitating movement of the vehicle over the land or water area receiving the slurry. The particular construction and support of the vehicle will be determined by the nature of the area receiving the slurry. For instance, a very wet land area, such as a wetland swamp, or water, requires the use of a floating vehicle, such as a sled hull, while a firmer land area will accommodate a wheeled vehicle.

One or more slurry projectors 38 are mounted upon each vehicle 34 and extend upwardly therefrom. Basically, the projectors 38 constitute nozzles obliquely oriented to the horizontal, such as at 45°, through which the high pressure slurry is aerially projected. The projectors 38 will usually include support structure permitting rotation of the projector about a vertical axis, and, if desired, remotely radio controlled adjusting mechanisms may be associated with the projector to control the horizontal inclination of the nozzle and the rotative position. In this respect, the projector structure may be similar to that shown in my U.S. Pat. Nos. 4,759,664 and 4,896,445.

A port 40 defined upon the vehicle 34 communicates with the projectors 38, and the hose conduit 30 attaches thereto wherein the hose conduit is mechanically fixed to the vehicle and retraction of the hose will pull the vehicle 34 across the area receiving the slurry.

The system 10 is distributed over the land area 42 over which the pumped slurry having the entrained solid spoils is distributed. The manifold conduit 18 is located as desired, and the retractor units 22 are connected to the feeder conduits 20. By the use of tractors, not shown, the vehicles 34 are pulled away from the retractor units 22 causing the hose 30 to unwind on the reels 24. The vehicles 34 are positioned as desired, which is either the maximum extent of the hose 30 length, or adjacent the perimeter of the land area 42.

Upon operation of the dredge 12 to remove a slurry of water and solid spoils from the waterway, the pumps of the dredge supply the feeder pump 16 which highly pressurizes the slurry and feeds the pressurized slurry into the manifold conduit 18 and the retractor units 22. The pressurized slurry will actuate the water powered motors 29 to slowly rotate the reels 24, and the pressurized fluid passes into the hoses 30 for distribution through the projectors 38.

It is of advantage to mount a pair of projector nozzles 38 on a common vehicle 34 as the rotation of the projectors can be related to counteract the thrust imposed on the projectors as the high pressure slurry is ejected therefrom. If desired, the nozzles may be adjusted by radio controlled mechanism and the slurry will be distributed over the area 42 as desired.

If it is desired that only a thin environmental slurry film be deposited on the area 42 the movement of the vehicles 34 will be relatively fast, as determined by adjustment of the motors 29, and also by controlling the size of the orifices on the projector nozzles 38. U.S. Pat. No. 4,896,445 discusses the thin environmentally acceptable distribution of slurry containing solids.

If it is desired that the elevation of the land or water bottom area 42 be substantially raised in a uniform manner the movement of the vehicles 34 will be relatively slow, and the volume of slurry leaving the projectors 38 will be permitted to be greater. In this manner a larger tonnage of solid spoils is deposited upon the area 42 and the elevation of the area built up in a manner as described in U.S. Pat. No. 4,759,664.

During operation, as the vehicles 34 approach the associated retractor unit 22 the dredge operation will be terminated, the booster pump 16 de-energized, and the entire system 10 may be relocated over the next area 42 to be treated.

Of course, it will be appreciated that positioning the conduit 18 and the vehicles 34 is a rather extensive undertaking, but as the system 10 is capable of covering many acres the practice of the invention permits very large land areas to receive the pumped slurry and solid spoils and the thickness of the spoils can be very accurately determined and controlled.

In FIG. 5, a variation of vehicle 34' is illustrated having a sled hull 36', and the flexible hose 30' associated with the retractor unit communicates with a manifold 44 supported on the superstructure of the sled hull 36'. A plurality of fixed nozzles 46 associate with the manifold 44, and the end nozzles 48 may be directed outwardly. This version of the vehicle and projectors utilizes fixed projectors and as the vehicle 34' is drawn toward the associated retractor unit the slurry will be distributed in a substantially rectangular pattern. With a sled such as shown at 34' the distribution of the sleds will be identical to that shown in FIG. 1, but as this embodiment requires a plurality of projectors very large pumping capacities are required, and this type of vehicle would normally be used wherein large quantities of slurry are to be distributed during a limited duration.

FIG. 6 illustrates a variation of the inventive concept wherein distribution of the slurry over an area is possible utilizing only a single vehicle supporting a slurry projector.

Figure 2:
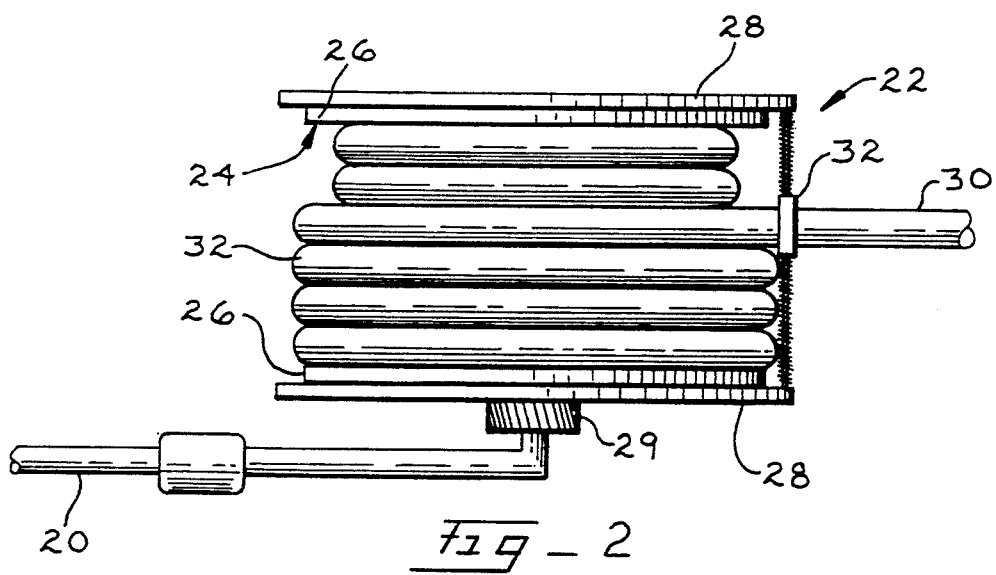
FIG. 2 is a side elevational view of a hose reel such as used with the embodiment of FIG. 1.
Figure 3:
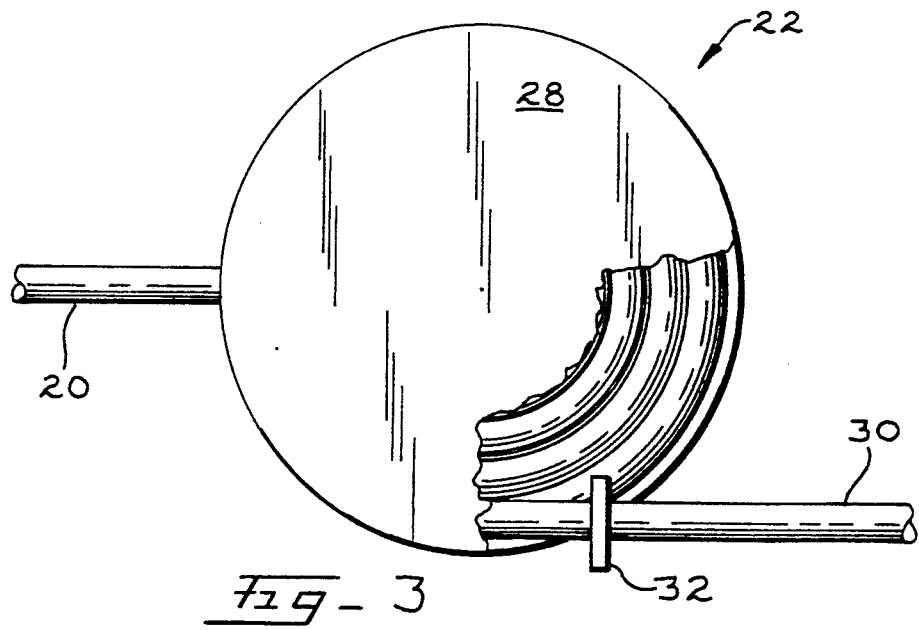
FIG. 3 is a top plan view of the hose reel of FIG. 2.

In the embodiment of FIG. 6 a distributor 50 is mounted upon a vehicle and communicates with a flexible supply hose, not shown, which may directly connected to a booster pump such as shown at 16 in FIG. 1. The distributor 50 includes a reel type retractor unit such as shown at 22 in FIG. 2, and is connected by the conduit 52 to a vehicle 54 which may be in the form of a floatable sled, or may be wheel supported, depending upon the nature of the area 55 upon which the slurry is to be deposited, and, the vehicle 54 has a slurry projector 38' mounted thereon.

A cable 56 passes around pulleys 58 and 60 spaced apart on the area 55, and a motor drive unit 62 is associated with the pulley 58 so as to translate the cable 56 in the desired direction. The distributor 50 is connected to one of the sides of the cable 56 so as to be translatable by the cable and drive unit 62.

Another rectangularly configured cable system 64 is supported upon pulleys 66, and pulleys, not shown, coaxially related to the pulleys 58 and 60. The cable 64 outlines the area 55, and the motor unit 62 is also capable of driving the cable 64 in the direction indicated by the small arrows, and if desired, the movement of direction of the cable 64 is reversible.

A pulley arrangement 68 is mounted upon the portion of the cable 64 parallel to and remote from the cable system 56, and a third cable system 70 extends between the distributor 50 and the pulley 68, and the cable 70 is connected to the vehicle 54 such that a motor unit, not shown, mounted upon distributor 50 can translate cable 70 and position the vehicle 54 as desired intermediate the distributor 50 and the pulley 68.

In the embodiment of FIG. 6 the distributor 50 is preferably located its maximum extent to the right adjacent pulley 60 by operation of the drive 62 and the cables 56. The vehicle 54 will usually be located as close as possible to the right pulley 66. Thereupon, pressurized slurry is provided to the distributor 50 and the vehicle 54 and projector 38' mounted thereon through the conduit 52 and the slurry will be distributed as the projector on the vehicle 54 rotates and deposits the slurry on the land area 55. As the slurry is distributed the distributor 50 may draw the vehicle 54 toward the distributor by means of the cable 70 while the hose 52 is wound upon a reel, and once the vehicle 54 is as close to the distributor 50 as desired the drive 62 may be energized to move the distributor 50 a predetermined distance to the left, FIG. 6, and then the cable 70 may be used to move the vehicle and its associated slurry projector away from the distributor 50 to make another pass across the area 55. This zigzag movement of the vehicle 54 over the area 55 is repeated until the entire area has been covered with the slurry and solid spoils.

The distribution system shown in FIG. 6 will not distribute slurry over a land or water area as quickly as the system 10 of FIG. 1, but the distribution system of FIG. 6 is much more economical to install than system 10, and may be more quickly put in place.

Another distribution system within the concept of the invention is shown in FIG. 7 wherein a substantially triangular area 71 may be treated with the deposited slurry.

In the embodiment of FIG. 7 the distributor 72 communicates with a pressurized slurry source such as a booster pump by a flexible conduit. The distributor 72 is substantially identical to the distributor 50 of the embodiment of FIG. 6, and through the flexible conduit 74 supplies the vehicle 76 with slurry for distribution by the rotary projector mounted upon the vehicle 76.

A cable 78 extends from the distributor 72 about the pulleys 80 located at spaced locations on the area 71. A pulley 82 is mounted upon the cable 78 between the pulleys 80, and a drive motor 84 associated with distributor 72 selectively operates the cable 78 and the cable 85 interposed between distributor 72 and pulley 82.

With the apparatus of FIG. 7, the vehicle 76 can be located as desired over the area 71 by selective operation of the cables 78 and 85, and a single vehicle 76 can be used to accurately distribute the slurry solids over a large triangular land or water area in an economical manner with a relatively easily installed distribution system.

Another embodiment for remotely distributing aerial projected slurry over a water area is shown in FIG. 8. In this embodiment the vehicle 34" is supplied from the flexible hose 30' associated with a retractor unit 22, as shown in FIG. 1. The vehicle 34" has one or more slurry projectors 38' located thereon. A pair of winches 86 mounted upon the vehicle 34" are each connected to a cable anchor 88 by a cable 90, and the winches 86 may be powered by the hydraulic pressure within the conduit 30'. The use of the winches 86 and the anchors 88 and cable 90 permit the position of the vehicle 34" to be very accurately controlled and the winches 86 may be used to accurately position the vehicle 34" as desired. This embodiment as shown in FIG. 8 is particularly suitable when distributing slurry over water areas and stabilization of the floating vehicle 34" is required.

With the embodiment of FIG. 8 it is also possible to use the reaction forces occurring at projectors 38 to move the vehicle 34" laterally with respect to the conduit 30", and by using radio controlled adjusting devices with the projectors 38' such reaction force locomotion can be achieved. The use of the projectors for motivation will be best understood by reference to U.S. Pat. No. 4,896,445.

In the disclosure of the inventive concepts it is to be appreciated that various known features of hydraulic systems may be used with the slurry distributing apparatus disclosed. For instance, accumulators and other similar devices may be used to maintain a uniform pressure within the manifolds and conduits, and the conduits may be provided with quick connect and disconnect couplings so that the length of the conduits may be quickly varied to accommodate the dimensions of the land or water area being treated.

It is appreciated that various modifications to the inventive concepts may be apparent to those skilled in the art without departing from the spirit and scope of the invention.

I claim:

1. Apparatus for evenly distributing a slurry comprising a mixture of water and solids over a large area to evenly build up the elevation of the area comprising, in combination, a pump communicating with a slurry source having a high pressure outlet, an elongated manifold extending over the area in communication with said pump outlet, a plurality of lateral conduit systems axially spaced along said manifold in communication therewith, each of said conduit systems including a vehicle mounted aerial projector, a flexible conduit connected to said manifold and said projector, and means for translating said projector over the area relative to said manifold comprising a power driven reel upon which said flexible conduit is wound, a hydraulic motor communicating with said manifold and powered by the pressurized slurry therein drivingly connected to said reel to rotate said reel, winding of said reel retracting the associated flexible conduit and translating the associated aerial projector over the area.

2. Apparatus for evenly distributing a slurry comprising a mixture of water and solids over a larger area to evenly buildup the elevation of the area comprising, in combination, a pump communicating with a slurry source having a high pressure outlet, a distributor in communication with said pump outlet, a flexible conduit in communication with said distributor, a vehicle supported upon the area, a slurry aerial projector mounted upon said vehicle, said conduit communicating with said projector, said motive means operatively associated with said vehicle for selectively translating said vehicle over the area comprising a first cable system disposed about the periphery of the area, said first cable system including spaced pulleys fixedly located on the area, a second cable system directly connected to said vehicle and connected to said first cable system whereby said first cable system positions said second cable system with respect to the area, and drive means connected to said first and second cable systems selectively operating said cable systems to position and translate said vehicle along said second cable system and position and translate said second cable system over the area.

* * * * *